United States Patent [19]

Arendt

[11] Patent Number: 4,941,768

[45] Date of Patent: Jul. 17, 1990

[54] QUICK DISCONNECT DEVICE

[75] Inventor: Timothy R. Arendt, South Euclid, Ohio

[73] Assignee: K & A Tool Company, Cleveland, Ohio

[21] Appl. No.: 266,375

[22] Filed: Nov. 2, 1988

[51] Int. Cl.⁵ .............................................. B25G 3/00
[52] U.S. Cl. ..................... 403/331; 403/339; 285/67; 285/325
[58] Field of Search ............ 285/137.1, 325, 67, 285/103; 403/331, 339, 340

[56] References Cited

U.S. PATENT DOCUMENTS

| | | | |
|---|---|---|---|
| 2,135,770 | 11/1938 | Ritchie | 285/156 |
| 3,260,539 | 7/1966 | Herron | 285/67 X |
| 3,934,605 | 1/1976 | Legris | 285/325 X |
| 4,557,261 | 12/1985 | Rugheimer | 285/155 X |
| 4,650,234 | 3/1987 | Blatt | 294/65 |

*Primary Examiner*—Andrew V. Kundrat
*Attorney, Agent, or Firm*—Baldwin, Egan, & Fetzer

[57] ABSTRACT

A transfer boom assembly for transferring workpieces in a workpiece manufacturing environment such as for example in an automobile manufacturing and assembly facility and which includes a quick disconnect device having nestable interfitting coupling parts for releasably connecting and/or disconnecting one or more workpiece transferring and/or fabricating units from its associated boom assembly.

4 Claims, 3 Drawing Sheets

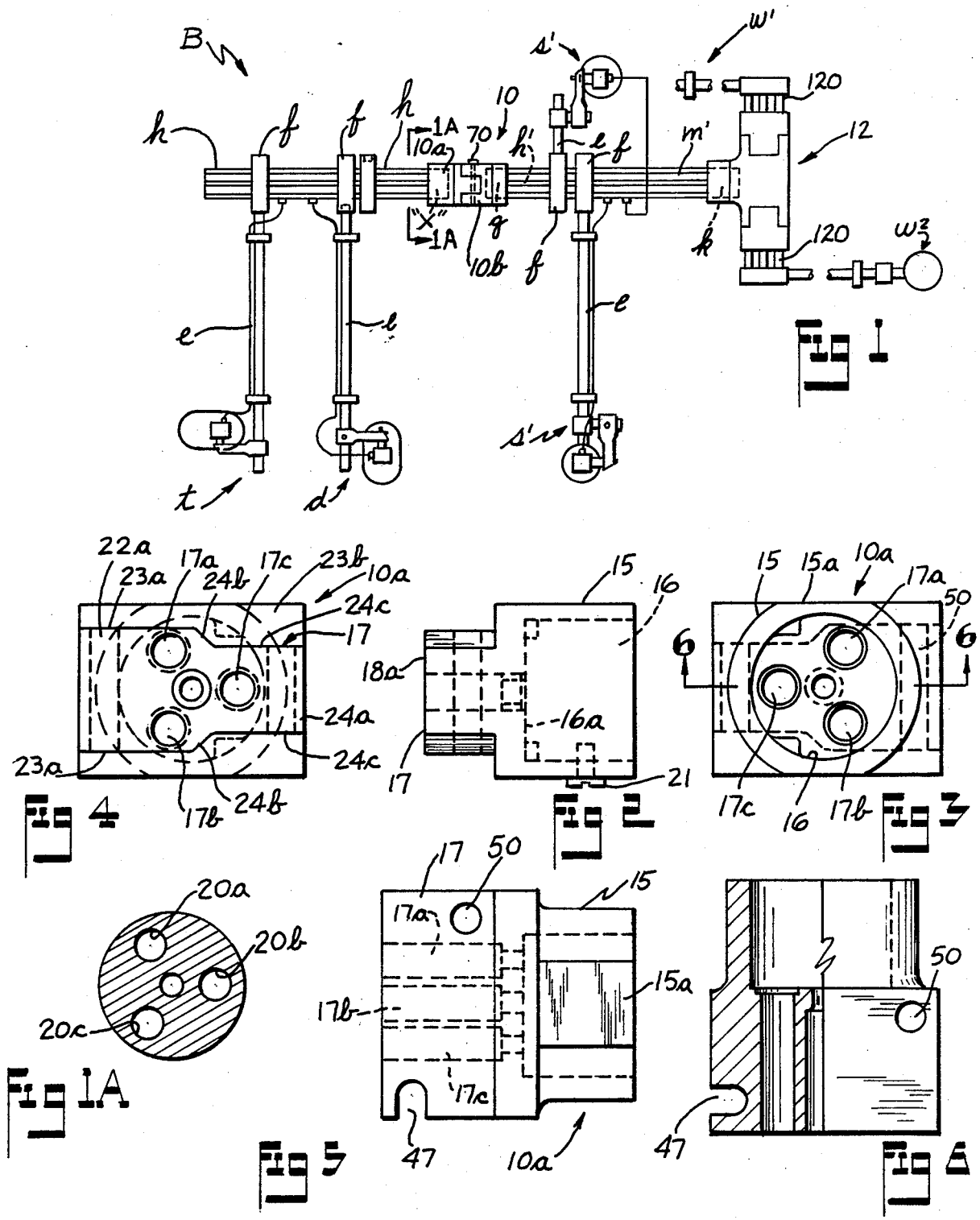

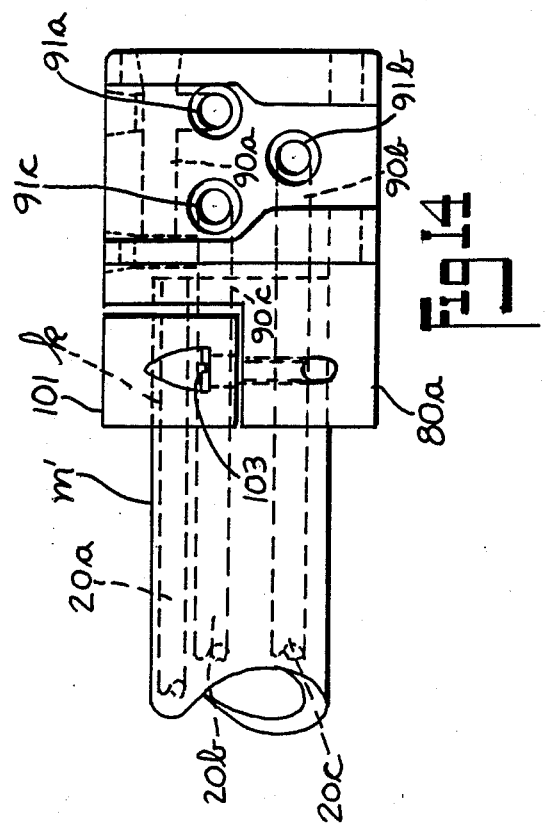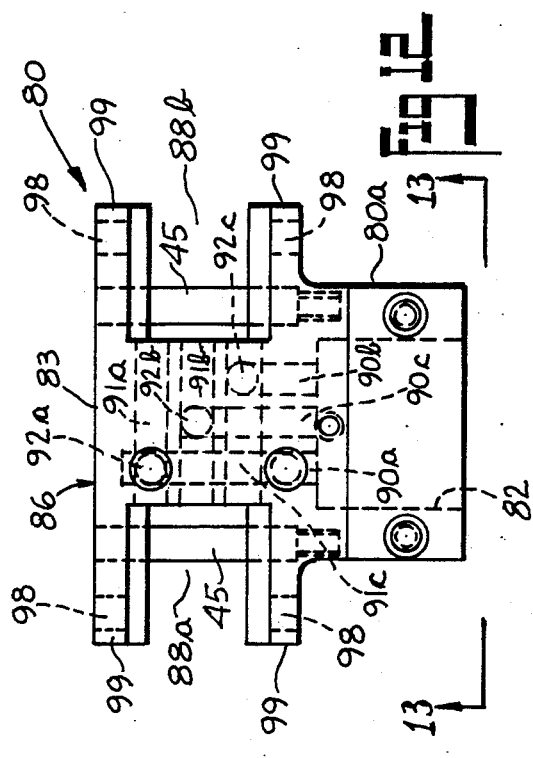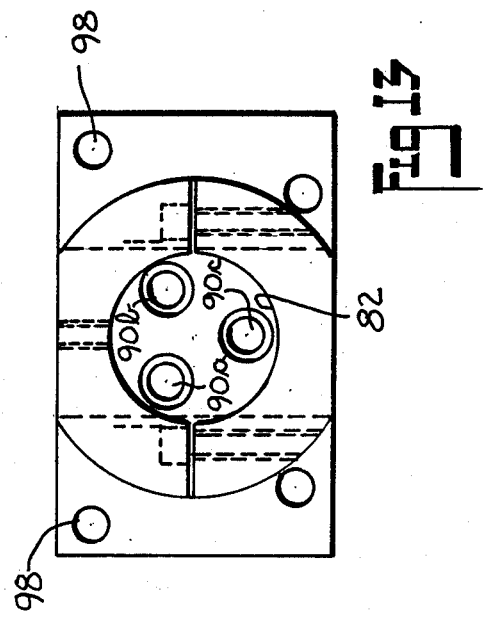

QUICK DISCONNECT DEVICE

SPECIFICATION

This invention relates to a transfer boom assembly for transferring workpieces in a workpiece manufacturing environment such as for example in an automobile manufacturing and assembly facility, and more particularly to a quick disconnect device for easily connecting and-/or disconnecting one or more workpiece transferring and/or fabricating units from its associated boom assembly.

BACKGROUND OF THE INVENTION

Transfer boom assemblies for transferring workpieces between work and/or assembly stations, in a manufacturing environment such as an automobile manufacturing and assembly facility are well known. One such assembly is disclosed in U.S. Pat. No. 4,650,234 issued on Mar. 17, 1987.

This type of boom assembly incorporates a plurality of work transfer devices usually supported in spaced relation along a boom disposed in the manufacturing facility, and which transfer devices are adapted to transfer workpieces to and from work and/or assembly stations in said facility.

As is well known, in the automotive field it is common to change design of the automobile periodically, usually on an annual basis. When this occurs, it is often required that the work stations, at which the various components of the newly designed automobile are manufactured, be modified to manufacture newly designed components. This also usually requires that the workpiece transfer devices, such as the transfer boom assembly, be correspondingly modified to accommodate the transfer of newly designed components in the manufacturing facility.

The quick disconnect device or unit of the present invention is especially designed for use with a transfer boom assembly as is disclosed in said U.S. Pat. No. 4,650,234, and enables one or more of the workpiece transfer mechanisms of said boom assembly to be rapidly and easily connected and/or disconnected to and from said assembly, and to thus enable the workpiece transfer mechanism to be correspondingly easily and rapidly selected and positioned on said assembly to accommodate design changes that have been incorporated into the product utilizing said boom assembly in its manufacture.

SUMMARY OF THE INVENTION

The quick disconnect device of the present invention is especially designed for use with transfer boom assemblies typical of which is disclosed in U.S. Pat. No. 4,650,234, and provides for easily and quickly connecting and/or disconnecting one or more of the workpiece transferring mechanisms of said assembly to correspondingly enable the said assembly to be thereby modified so as to accommodate a particular workpiece transferring operation.

Another object of the present invention is to provide a quick disconnect device as above described, and which is substantially compact and relatively simple in its construction.

Other objects and advantages of the quick disconnect device of the present invention will be apparent from the following description of several preferred embodiments as described in the accompanying drawings.

BRIEF DESCRIPTION OF THE DRAWINGS

FIG. 1 is a partial top plan view of a typical transfer boom assembly having a plurality of workpiece transfer mechanisms, and showing the quick disconnect device of the present invention releasably connecting several of said mechanisms to the main boom of said assembly;

FIG. 1A is a sectional view taken along lines 1A—1A of FIG. 1;

FIG. 2 is a top view of one of the two components comprising one embodiment of the quick disconnect device of the present invention;

FIG. 3 is one end view of the component of FIG. 2;

FIG. 4 is the opposite end view of the component of FIG. 2;

FIG. 5 is a side view of the component of FIG. 2;

FIG. 6 is a partial sectional view of the component of FIG. 2 taken on line 6—6 of FIG. 3;

FIG. 12 is a second embodiment of quick disconnect device of the present invention and which incorporates a modified or double-ended component along with two components of the type illustrated in FIGS. 2-6;

FIG. 13 is a view taken along lines 13—13 of FIG. 12; and

FIG. 14 is a side view of the quick disconnect device of FIG. 12 shown connected to the boom arm of the boom assembly.

DESCRIPTION OF PREFERRED EMBODIMENTS

Figure 10:
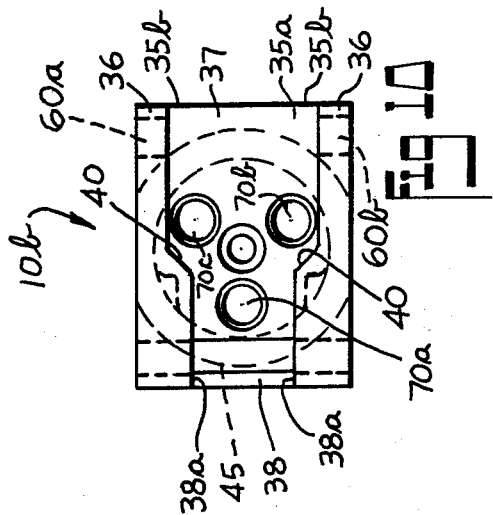
FIG. 10 is the opposite end view of the component of FIG. 7.

Referring to FIG. 1, there is shown a typical transfer boom assembly, identified in its entirety at B, and which is adapted to be disposed within a manufacturing facility such as, for example, an automobile assembly line. As will be understood, the boom assembly supports a plurality of various kinds of suitable tools and/or workpiece transfer devices as are depicted at t and d which are operable to enable fabrication and/or the transfer of workpieces in and along the assembly line. One environment of use to which this type of transfer boom assembly is particularly adapted is in the manufacture and/or transfer of automotive body panels, roofs, decks and the like in an automotive assembly line.

Each of the devices t and d is connected by a boom-type arm e to a boom mount f which, in turn, is mounted upon main boom arm h. As will be understood, the main boom arm h may be formed with suitable internal conduits and/or passages such as is depicted in FIG. 1A at 20a, 20b and 20c to which are connected a source of pressurized air or other suitable fluid, which is then connected by suitable like conduits and/or passages in boom arms e and mounts f to the associated workpiece devices d and t for operation thereof.

U.S. Pat. No. 4,543,034 discloses in greater detail a typical transfer boom assembly which utilizes pressurized air as a source of power for operating the several workpiece devices d and t, and the disclosed boom assembly as is set forth in said prior patent is incorporated herein by reference.

As will be understood, with the boom assembly B disposed along an assembly line in an automotive assembly, or the like, various components such as doors, decks, hoods, fenders, etc. may be held and supported by its respective workpiece device t or d and thus be either manually and/or automatically moved to the automobile for assembly thereon.

In the automotive field it is common to periodically change the design and/or structural assembly of automotive vehicles such as, for example, on an annual basis. When this occurs, it is oftentimes necessary to modify the transfer boom assembly and the type and/or location of the workpiece devices d and t.

The quick disconnect device of the present invention enables the selection of workpiece devices d, t, etc. as well as their location along the main boom arm h of boom B to be more easily accomplished than was heretofore possible and to enable such selection and location of said workpiece devices to be accomplished with a minimum of disassembly of the boom B.

Referring to FIG. 1, there is depicted two embodiments of quick disconnect devices of the present invention, the first being a single type quick disconnect device identified at 10 for attaching a single workpiece device to the main boom arm h and the second a double quick disconnect device identified at 12 for attaching two workpiece devices to the main boom arm h.

Referring now the single type quick disconnect device 10, as best seen in FIGS. 2-11, it is generally of overall tubular configuration and comprises two parts, a male coupling part 10a FIGS. 2-6 and a female coupling part 10b FIGS. 7-11 which, as assembled, are partially nested and interconnected together.

The male coupling part 10a, as seen in FIGS. 2-6, comprises a cylindrical portion 15 with opposed flats 15a defining an internal bore chamber 16 formed integrally on one end. Boss or projection 17 is formed on the opposite end. Three ports 17a, 17b and 17c are formed in coupling part 10a equally spaced about the longitudinal axis, each of which extends from the base 16a of chamber 16 parallel to said axis and longitudinally through projection 17 and opening to the end face 18 of said projection 17.

As seen in FIG. 1, coupling part 10a is adapted to fit over the end "x" of the main boom arm h, said end extending into the chamber or bore 16 whereby the ports 17a, 17b and 17c are in fluid connection with the corresponding conduits 20a, 20b and 20c as seen in FIG. 1A, respectively, formed in arm h and extending completely therethrough and which, in turn, is adapted to connect to the source of pressurized air not shown.

A suitable fastener, as depicted at 21 in FIG. 2, may be threadably disposed in the wall of cylindrical portion 15 and into engagement with the end e of boom arm h to thus resiliently retain the same in the bore 16.

As aforementioned, the coupling part 10a is formed with a projection 17 on its end opposite cylindrical part 15, said projection, as seen in FIGS. 2-6, being somewhat key or Y-shaped in overall configuration, with one end of the key being defined by an enlarged part 22a formed with opposed side walls 23a extending perpendicularly outwardly from wall 23b, said side walls 23a likewise being perpendicular to the end face 18a of said projection 17.

The remaining or stem portion of said Y-shaped projection 17, as seen at 24a, is smaller in its width than its associated part 22a, and extends similarly outwardly from wall 23b and integrally connects to said enlarged part 22a by tapered shoulders 24b, thus connecting side walls 23a of said enlarged part 22a and side walls 24c of said part 24a.

The quick disconnect device 10, as aforementioned, also includes a female coupling part 10b. As best seen in FIGS. 7-11, the female coupling part 10b comprises a cylindrical part 28 which is similar to cylindrical part 15 of the male coupling part 10a and which is formed with an internal bore or chamber 29.

As seen in FIG. 1, one end g of a boom extension h' similar to boom arm h is inserted into bore 29 to thus provide for additional workpiece stations s' to be disposed along the assembly line. As will be understood, the boom extension h' may be suspended by any suitable means (not shown) along the assembly line in a manner similar to that utilized for the main boom assembly B.

Figure 7:
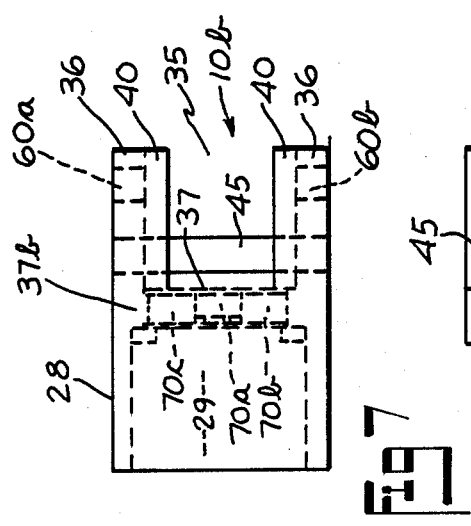
FIG. 7 is a top plan view of the second component of the quick disconnect device.
Figure 8:
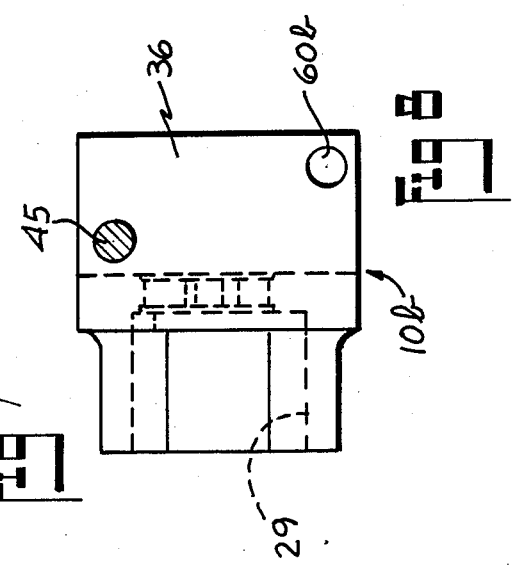
FIG. 8 is a side elevational view of the second component of FIG. 7.
Figure 9:
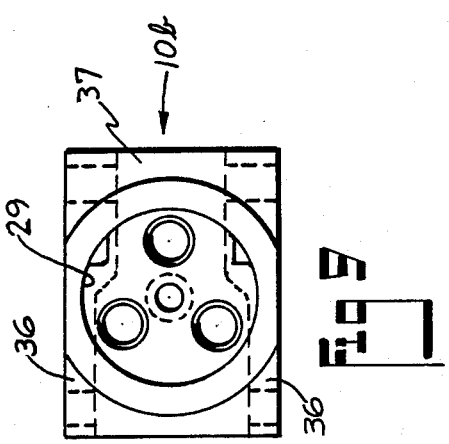
FIG. 9 is an end view of the second component of FIG. 7.
Figure 11:
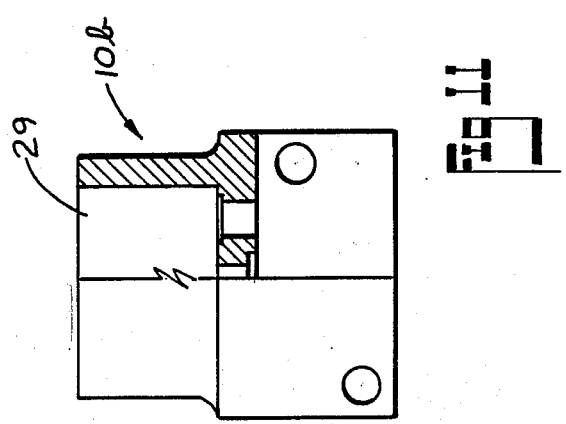
FIG. 11 is a partial sectional view of the component of FIG. 7 taken approximately on the line 11—11 of FIG. 7.

As seen in FIGS. 7 and 10, the female coupling part 10b is formed centrally with a generally key-shaped cavity or recess 35, defining opposed shoulders 36 projecting perpendicularly outwardly from flat surface 37. Surface 37 forms one surface of intermediate transverse wall 37b which separates chamber 29 from said cavity 35. As best seen in FIG. 10, the cavity or recess 35 is of stepped configuration having a wide portion 35a formed with opposed walls 35b, and a somewhat more narrow portion 38 formed with opposed walls 38a. Walls 35b and 38a interconnect by inclined wall or shoulder 40. Walls 35b, 38a, and inclined walls or shoulders 40 project outwardly perpendicularly from base wall 37, each pair of said walls 35b and 38a being likewise in parallel spaced relation to each other.

The key-shaped cavity or recess 35 of coupling part 10b is slightly larger in its dimensional configuration than projection 17 of coupling part 10a whereby said projection 17 may be slidably inserted into said cavity or recess 35 in substantial close interfitting nesting relationship to effect surface to surface contact throughout with respect to the corresponding walls and shoulder portions of said interfitting projection and cavity.

As best seen in FIGS. 7 and 10, a rod member 45 extends between shoulders 36 and projects transversely across recess 35.

As seen in FIGS. 2 and 5, a slot 47 is formed in projection 17, and when said two coupling parts 10a and 10b are assembled together the rod member 45 is disposed within slot 47 to thus releasably lock said parts together thus preventing relative rotation therebetween.

Coupling part 10a is likewise formed with hole 50, FIGS. 2 and 5, which extends through the enlarged part 22a of the key-shaped projection 17. Holes 60a and 60b FIG. 10 are likewise formed in the shoulders 36 of coupling part 10b which, when said coupling parts 10a and 10b are fully assembled, align with hole 50. A releasable locking pin 70, FIG. 1, is inserted into said aligned holes 50, 60a and 60b being effective to releasably lock said coupling parts together.

As seen in FIGS. 7 and 10, ports 70a, 70b and 70c are formed in the transverse wall 37b which open to recess 29 and cavity 35. When the two coupling parts 10a and 10b are assembled in nesting relationship said ports 70a, 70b and 70c align with ports 17a, 17b and 17c to thus enable the source of power, pressurized air or the like (not shown) to be connectable to the associated conduits 20a, 20b and 20c in boom arm h' and thereby provide said power source to said work stations s'.

As aforementioned, suitable internal conduits or passages (not shown) in boom arm mounts f connecting with conduits 20a, 20b and 20c may be utilized to connect the power source to each work station s'.

With this assembly, an extension boom arm h', FIG. 1, and additional work stations s' carried thereon, may be easily attached to the main boom arm h to thus locate said additional work stations along the assembly line without disturbing the original boom arm assembly, the end of which assembly coupling part 10a connects.

Referring now to FIGS. 12-14, a second embodiment of quick disconnect coupling device 80 is shown, and which is a double-ended device, enabling as seen two work stations $w^1$ and $w^2$ FIG. 1 disposed on opposite sides of the assembly line to be easily and quickly connected to the main boom arm h or h'.

The coupling device 80 is somewhat T-shaped in configuration as seen in FIG. 12 having a circular bore 82 formed centrally in its stem part 80a.

The top or cross bar portion 83 of the coupling device 80 comprises a double-ended coupling part 86 having opposed cavities or recesses 88a and 88b extending outwardly in opposite directions from the center of said cross bar 83. Each cavity or recess 88a and 88b is similar in dimensional configuration to the cavity or recess 35 of the coupling part 10b, FIG. 7, to thereby enable using the same male coupling part 10a with either the single coupling part 10b or the double-ended coupling part 80.

As best seen in FIGS. 13 and 14, three ports 90a, 90b and 90c are formed in the stem part 80a of coupling device 80 each communicating at one end with the bore 82.

Three ports 92a, 92b and 92c are formed in the cross bar portion 83 of coupling device 80 extending completely therethrough and opening into cavities 88a and 88b. Ports 92a, 92b and 92c extend transversely to ports 90a, 90b and 90c, each of the latter connecting with one of said ports 92a, 92b and 92c.

With this construction, with the end k of boom arm m', as seen in FIG. 14, disposed within bore 82, one of the conduits 20a, 20b and 20c connects with one of the bores 90a, 90b and 90c and thereby connects the power source (pressurized air) to each of the ports 92a, 92b and 92c whereby said source is connectable by coupling parts 10a and their internal ports 17a, 17b and 17c to the work stations $w^1$ and $w^2$.

In this manner, with the double-ended coupling part 80 attached to the end k' of the boom arm m', and with coupling parts 10a disposed in each cavity or recess 88a and 88b the additional work stations $w^1$ and $w^2$ may be disposed on opposite sides of the main boom arm h.

Rod 45 may also be secured in each cavity 88a, 88b projecting thereacross and thereby in position to be disposed within the slot 47 of the male coupling part 10a effective to interlock the same together. Likewise, a releasable locking pin 70, extending through holes 98 in each arm 99 of the double-ended coupling part 80 and hole 50 in the coupling part 10a when the latter is disposed within said cavities 88a, 88b, releasably locking said parts together in their nested interconnected relation. Each port 90a, 90b and 90c extends through the base 89 and connects at its opposite end intermediately with one of three ports 91a, 91b and 91c, which project transversely through base 89, being open at each end, thus communicating with the recesses 88a, 88b.

The free end k of the boom arm h or h' is insertable into the bore 82, such that said ports 90a, 90b and 90c communicate, one each, with one of the conduits 20a, 20b, 20c extending centrally through said boom arm to thereby connect the source of power (pressurized air) to said coupling device 80 and hence through ports 90a, 90b and 90c and connected ports 91a, 91b and 91c to the recesses 88a and 88b of the double-end coupling part 86.

A semi-circular locking collar 101 is placed over the boom arm k and is releasably secured by fasteners 103 to the stem part 80a of the coupling device 80 to thus releasably retain said boom arm in said bore 82.

A male coupling part 10a is receivable into each recess 88a, 88b of coupling part 86, extending diametrically opposite each other and on opposite sides of the boom arm h'.

As seen in FIG. 1, a work station $w^1$ and $w^2$ is attachable to and suspended by each coupling part 10a on opposite sides of the assembly line. The power source (pressurized air) may then be connectable through ports 17a, 17b and 17c in the coupling part 10a by any suitable hose couplings or the like 120 to the tools at each working station $w^1$ and $w^2$.

With the above described construction of single and double-ended quick disconnect devices, it is now apparent that the location and/or addition of work stations along the boom arm h or h' on an assembly line such as in an automotive plant may be easily and quickly made without any appreciable interruption to the non-affected work stations.

Having thus described several preferred embodiments of quick disconnect device of the present invention,

I claim:

1. A quick, disconnect coupling device for releasably connecting a work station having working tools and the like to a boom arm for locating said work station along an assembly line or the like, said quick disconnect device comprising; a plurality of first coupling parts and means to releasably connect each said first coupling part to the boom arm, projection means on each said first coupling part, a second coupling part, a plurality of recess means on said second coupling part each of which nestably receives a projection means of a first coupling part to enable a plurality of first coupling parts to be nestably releasably connected to the second coupling part, and means for releasably locking said parts in said nested relation and means for releasably attaching tools and the like to said second coupling part at said work station.

2. A quick disconnect coupling device as defined in claim 1 and wherein the projection means and recess means are complementary in configuration effective to provide surface to surface contact therebetween in nested relation.

3. A quick disconnect coupling device as defined in claim 2 and wherein the projection means and recess means are complementary key-shaped in contour to provide surface to surface contact therebetween when in nested relation.

4. A quick disconnect coupling device for releasably connecting a work station having working tools and the like to a boom arm for locating said work station along an assembly line or the like, said quick disconnect device comprising; a first coupling part having an internal bore chamber to releasably connect said first coupling part to the boom arm, a second coupling part, means on said first and second coupling parts for releasably nesting said coupling parts together comprising a key-shaped projection formed in said first coupling part and extending longitudinally outwardly therefrom on the end opposite said bore chamber, a key-shaped recess formed on said second coupling part, said projection being nestably disposed within said recess and being complementary in contour to provide surface to surface contact therebetween effective to releasably lock said first and second coupling parts together, and means for releasably attaching tools and the like to said second coupling part at said work station.

* * * * *